United States Patent [19]
Cleary

[11] 4,353,205
[45] Oct. 12, 1982

[54] PRIMARY ZONE AIR PROPORTIONER

[75] Inventor: Edward N. G. Cleary, San Diego, Calif.

[73] Assignee: The United States of America as represented by the United States Department of Energy, Washington, D.C.

[21] Appl. No.: 140,947

[22] Filed: Apr. 16, 1980

[51] Int. Cl.³ .............................................. F02C 3/22
[52] U.S. Cl. ................................. 60/39.12; 60/39.23; 60/726
[58] Field of Search ................. 60/39.12, 726, 39.23, 60/39.07

[56] References Cited

U.S. PATENT DOCUMENTS

| | | | | |
|---|---|---|---|---|
| 2,458,497 | 1/1949 | Bailey | ......................... | 60/39.23 |
| 3,581,493 | 6/1971 | Trumbull | ......................... | 60/726 |
| 3,722,218 | 3/1973 | Lapera | ......................... | 60/726 |
| 3,866,411 | 2/1975 | Marion et al. | ......................... | 60/39.12 |
| 4,054,028 | 10/1977 | Kawaguchi | ......................... | 60/39.23 |
| 4,150,953 | 4/1979 | Woodmansee | ......................... | 60/39.12 |
| 4,199,933 | 4/1980 | Pfenninger | ......................... | 60/39.12 |

*Primary Examiner*—Robert E. Garrett
*Attorney, Agent, or Firm*—Judson R. Hightower; Richard G. Besha; James E. Denny

[57] ABSTRACT

An air proportioner is provided for a liquid hydrocarbon fueled gas turbine of the type which is convertible to oil gas fuel and to coal gas fuel. The turbine includes a shell for enclosing the turbine, an air duct for venting air in said shell to a gasifier, and a fuel injector for injecting gasified fuel into the turbine. The air proportioner comprises a second air duct for venting air from the air duct for mixing with fuel from the gasifier. The air can be directly injected into the gas combustion basket along with the fuel from the injector or premixed with fuel from the gasifier prior to injection by the fuel injector.

9 Claims, 5 Drawing Figures

PRIMARY ZONE AIR PROPORTIONER

The U.S. Government has rights in this invention pursuant to Contract No. EF-77-C-01-1514 between the U.S. Department of Energy and Westinghouse Electric Corporation.

BACKGROUND OF THE INVENTION

1. Field of the Invention

This invention relates to gas turbines of the type which are convertible for use with different fuels and more particularly to a primary zone air proportioner for controlling the richness of fuel supplied to such turbines in accordance with the requirements of the particular fuel used.

2. Description of the Prior Art

An important design criterion for gas turbine power plants is that the plant accept a variety of different fuels and continue to operate efficiently. This criterion is becoming increasingly important as the future availability of certain fuels or fuel types becomes uncertain. Thus, for example, if liquid hydrocarbon fuels become scarce and/or prohibitively expensive, a power plant, to continue to operate economically, must be convertible to, for example, oil gas fuel or coal gas fuel. However, the optimum ratio of air to fuel varies for various types of fuels. When the proper air to fuel ratio for a particular fuel is established, not only does such a gas turbine run more economically by not consuming a mixture richer in fuel than is necessary, but also undesirable emission products produced from the fuel consumed by the plant are reduced.

Various devices for controlling the air to fuel ratio in an engine provide diverting air, whether it be preheated or not, for mixing with the fuel prior to or during combustion. Examples of fuel and air mixing devices for gas turbines can be found in U.S. Pat. Nos. 2,760,336 and 3,002,346 although this listing is obviously far from exhaustive.

SUMMARY OF THE INVENTION

The present invention concerns a primary zone air proportioner for a gas turbine capable of burning oil gas fuel, coal gas fuel, liquid hydrocarbon and gaseous hydrocarbons. The air proportioner vents air, which can be preheated, for mixing with the selected fuel prior to injection or during combustion. The air proportioner preferably is adjustable to vary the air to fuel ratio for the most efficient operation of the turbine with the selected fuel. With such an adjustment, the turbine runs more economically by not consuming a mixture richer in fuel than is necessary and consequently, the emission products produced by the plant are reduced.

According to a preferred embodiment thereof, the air proportioner of the invention comprises auxillary ducting, connected to an air duct providing venting of air from the turbine shell to the gasifier, for feeding back a portion of the air for mixing with the fuel. This air can be directly injected into the combustion basket, with the auxiliary ducting surrounding the fuel injector in coaxial relationship therewith. Alternatively, the air can be premixed with the fuel prior to injection. As noted above, the amount of air fed back is preferably made variable, although a duct of a fixed, optimum size, or having an orifice therein of an optimum size, can be used.

Additional features and advantages of the invention will be set forth in, or apparent from, the detailed description of the preferred embodiments of the invention found hereinbelow.

DESCRIPTION OF THE PREFERRED EMBODIMENTS

Figure 1:
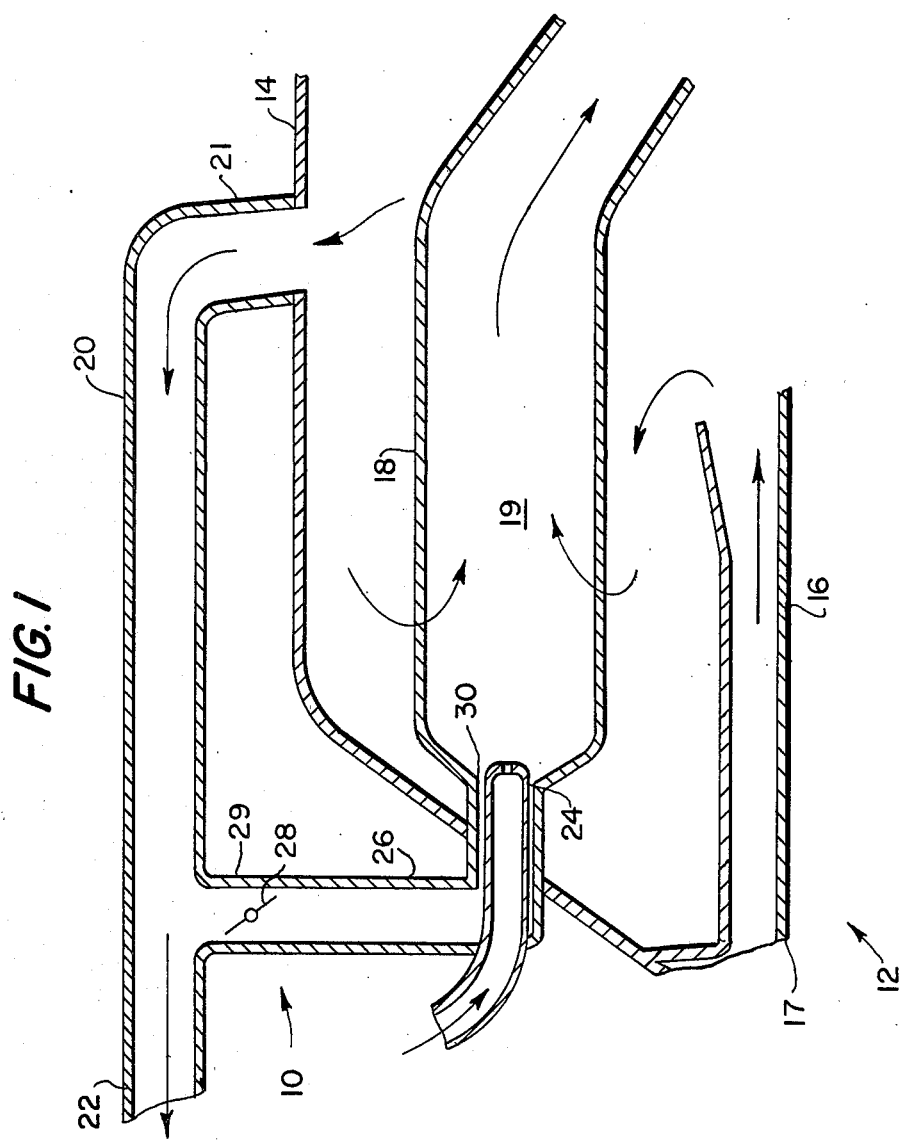
FIG. 1 is a longitudinal cross-sectional view of the principal parts of a gas turbine incorporating a primary zone air proportioner in accordance with the invention.

With reference to the drawings and, in particular, to FIG. 1, there is shown the preferred embodiment of a primary zone air proportioner, generally denoted 10 in combination with a gas turbine, generally denoted 12.

The relevant components of gas turbine 12 are shown schematically in FIG. 1 and these will be briefly discussed before considering the primary zone air proportioner of the invention. Thus, gas turbine 12 includes a shell 14 which encloses and houses the turbine and which is of a rigid but light weight metal construction. This construction enables shell 14 to withstand the pressure and temperature extremes of the turbine. Attached to shell 14 is a diffuser 16 which preferably defines a plurality of passageways, such as, passageway 17, which are in fluid communication with openings along shell 14. The passageways also are in fluid communication with the environment surrounding turbine 12. Turbine 12 further includes a perforated combustion basket 18, or multiplicity thereof, located inside shell 14.

Basket 18 is a generally elongate tubular metallic structure capable of withstanding the temperature and pressure extremes of turbine 12. The perforations of basket 18 are generally located circumferentially along the length thereof. These perforations provide fluid communication between the space enclosed by shell 14 and the space enclosed within basket 18. The forward portion 19 of basket 18, where fuel is injected into basket 18 and where combustion of this fuel is initiated, is referred to as the primary combustion zone. Affixed to shell 14 so as to be in fluid communication with the space enclosed thereby is a first end 21 of an air duct 20. Air duct 20 is generally an elongate, metallic tubular structure located externally of shell 14. The other end 22 of air duct 20 is in fluid communicatin with a coal or oil gasifier (not shown). Turbine 12 further comprises a fuel injector 24 positioned so as to inject fuel into primary combustion zone 19 of basket 18. Injector 24 is in fluid communication with the gasifier by suitable conventional connections (not shown).

It should be understood that the gasifier of turbine 12 can be bypassed if turbine 12 is converted so as to use liquid or gaseous hydrocarbons.

Turning now to the invention, primary zone air proportioner 10 includes a second or auxiliary air duct 26 which vents air from air duct 20. The upstream end 29 of duct 26 is connected in fluid communication to air duct 20 at a point located between ends 21 and 22 of the latter. An air control valve 28 is located inside of duct 26 for controlling the air flow therethrough. The downstream end 30 of auxiliary duct 26 is in fluid communication with primary combustion zone 19 of basket 18. As depicted in FIG. 1, duct 26 is generally L-shaped in cross-section and injector 24 extends through the rear wall of the downstream leg of duct 26 and extends longitudinally thereof. This leg of duct 26 surrounds the injector 24 so as to form an annular passage, the injector terminating adjacent the downstream end 30 of duct 26. Thus, fuel discharged from injector 24 into basket 18 immediately contacts air discharged from the downstream end 30 of duct 26. It will be appreciated that a variety of configurations of duct 26 and injector 24 can be used so long as the fuel injected into basket 18 by injector 24 is made to contact with air injected from duct 26.

Air control valve 28 of air proportioner 10 is located inside second duct 26 adjacent upstream end 20. Valve 28 is preferably a butterfly-type valve and is adjustable from a position that essentially blocks the flow of air through duct 26 to a position that offers minimum resistance to the flow of air through duct 26. It will be understood that other types of valves can be substituted for butterfly valve 28 so long as the air flowing through duct 26 is controlled in a manner similar to the control achieved with a butterfly-type valve.

The operation of primary zone air proportioner 10 in combination with turbine 12 will now be considered. Air enters turbine 12 through diffuser 16 and fills the space enclosed by shell 14. Some of this air flows through the perforations of basket 18 and is used in the combustion of fuel occurring in basket 18. It is contemplated that the geometrical relationship between shell 18 and air duct 20, in a preferred embodiment, is such that approximately 25 percent of the air in shell 18 passes into first air duct 20. It should also be noted that the air entering duct 20 is preheated by the combustion of fuel in basket 18. The air in duct 20 passes to the gasifier in the amount required for coal or oil gasification. As described above, a portion of the air in duct 20 flows into the upstream end 29 of second duct 26. A variable amount of air flows through second duct 26 to downstream end 30 thereof, depending upon the position of air control valve 28. Air exiting from end 30 of duct 26 is injected into primary combustion zone 19 of basket 18, simultaneously with and adjacent to the fuel injected by injector 24, and the fuel and air are burned in primary combustion zone 19.

As noted hereinbefore, the richness or leanness of the fuel burned in basket 18 can be controlled by varying the amount of air that flows through duct 26 for eventual mixing with fuel from injector 24 by adjusting air control valve 28. Thus, if turbine 12 is burning too rich a mixture of fuel and air, additional air can be allowed to flow through duct 26 to lean out the mixture. It is also noted that when the fuel to air ratio is too rich, complete combustion of the fuel may not occur with the resulting increase in emission products. Thus, by increasing the amount of air flowing through duct 26, not only will the fuel to air ratio be leaned out, but also the amount of emission products can be minimized.

The capability of controlling the richness of the fuel is especially important for dual fuel machines that can use liquid hydrocarbons and coal or oil gas fuel in that more air must be mixed with the fuel in primary combustion zone 19 when operating with liquid hydrocarbon fuels as compared to coal or oil gas fuels.

The thermodynamics of coal gasification indicates that operation with coal gas at 1600°–1800° F. is highly desirable. Using coal gas at such temperatures will result in improved stability limits. The following table shows the approximate flammability limits of a typical coal gas (of composition $H_2$: 15%, CO: 19%, $CH_4$: 3%, $N_2$: 54%, $CO_2$: 9.0%) as a function of coal gas temperature. The calculations were made using the method of Le Chatelier. The data used is from Gas Engineers' Handbook, 1964, p. 2/73. The handbook gives five flammability limits of CH, H and CO in the range of 63° F. to 752° F. The remaining data points have been extrapolated.

| Temperature (T) | 63° | 350° | 550° | 1600° | 1800° |
|---|---|---|---|---|---|
| Lower Flammability Limit | 18.242 | 15.657 | 14.08 | 8.238 | 7.46 |
| Ratio | 1.0 | 1.165 | 1.296 | 2.214 | 2.445 |

$$\text{Ratio} = \frac{\text{Lower Limit @ Gas Temperature} = 63°\ F.}{\text{Lower Limit @ Gas Temperature} = T°\ F.}$$

Thus, at elevated temperatures the fuel may be leaned out even more, and consequently lower emission levels can be obtained.

Figure 2:
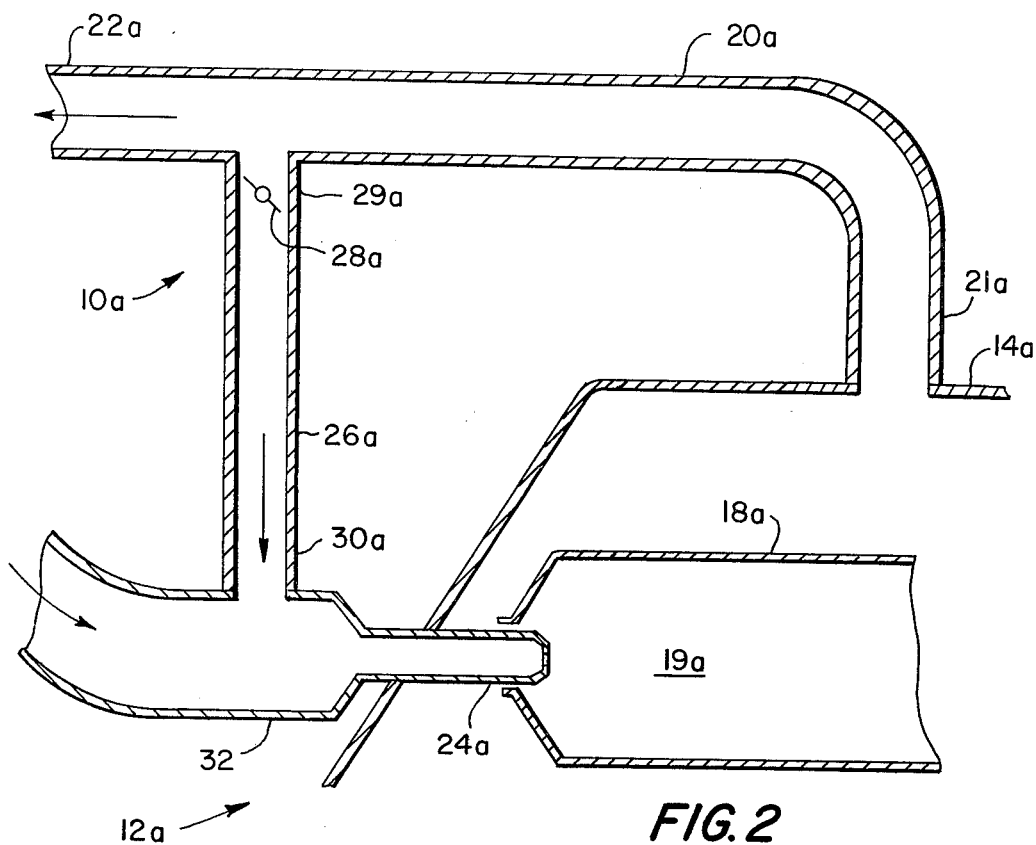
FIG. 2 is a cross-sectional view of another embodiment of the air proportioner in accordance with the invention.

A further embodiment of the invention is depicted in FIG. 2. Basically, this embodiment is similar to the embodiment shown in FIG. 1 and like elements have been given the same numerals with an "a" attached. The only difference between the two embodiments is that in the embodiment of FIG. 2 the downstream end 30a of the second air duct 26a injects air into a premix chamber 32 instead of directly into combustion basket 18a. As depicted in FIG. 2, premix chamber 32 is an enlarged section of the conduit that supplies fuel from the gasifier to fuel injector 24a. Chamber 32 allows air from second duct 26a to be mixed with the fuel prior to the mixture being injected into combustion basket 18a. Such an arrangement provides a somewhat more uniform mixture of fuel and air than does the embodiment depicted in FIG. 1.

Figure 3:
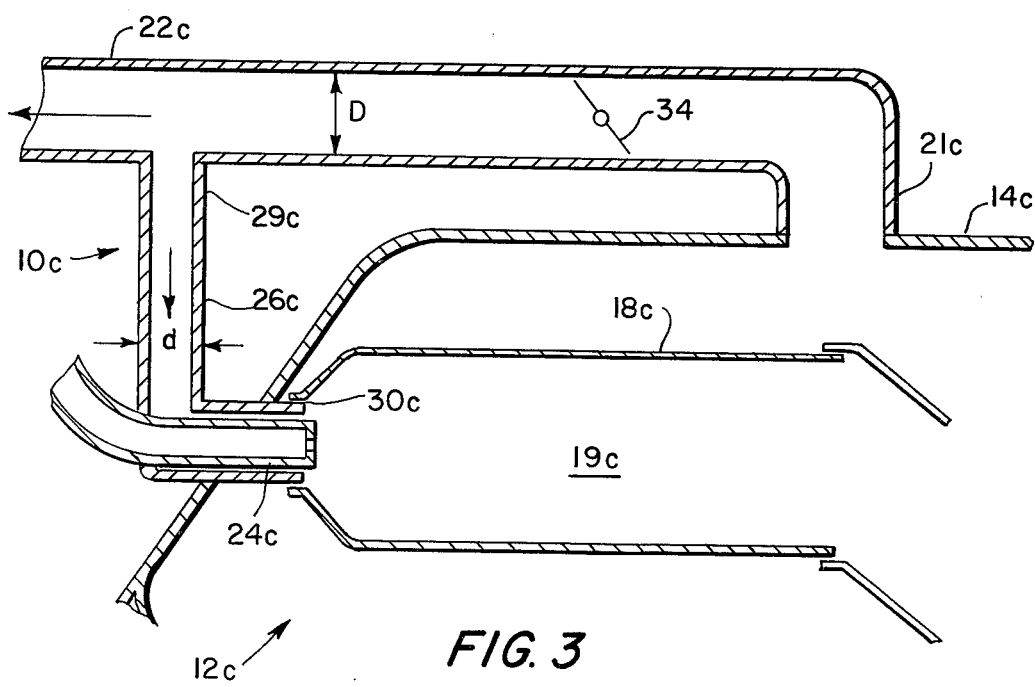
FIG. 3 is a cross-sectional view of a further embodiment of the air proportioner of the invention.
Figure 4:
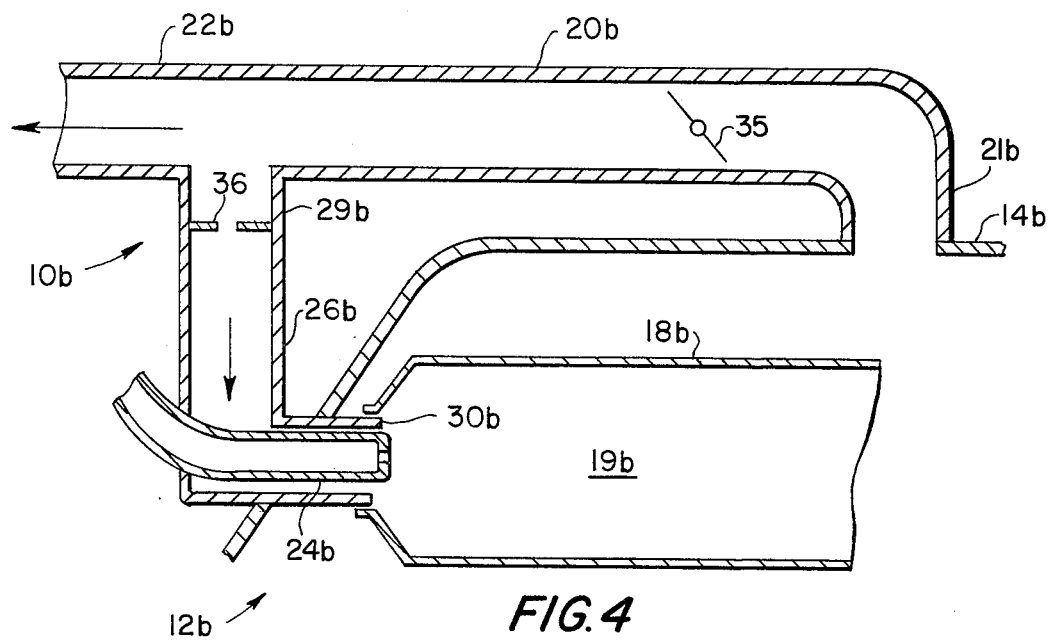
FIG. 4 is a cross-sectional side elevation view of yet another embodiment of the air proportioner of the invention.

Two further alternative embodiments are depicted in FIGS. 3 and 4. These embodiments are similar to that of FIG. 1 and like elements have been given the same numbers with the letter "c" attached for FIG. 3 and the letter "b" attached for FIG. 4. Both of these embodiments use a fixed geometry to determine the appropriate rate of air flow through duct 26. In the embodiment of FIG. 3, the ratio of the diameter D of air duct 20c to the diameter D of second duct 26c determines the fixed rate by which air is metered through duct 26c to combustion basket 18c. In the embodiment of FIG. 4, the size of an orifice 36 located in second duct 26b determines the fixed rate by which air is metered through duct 26b to combustion basket 18b.

It should be noted that since in the embodiments of FIGS. 3 and 4 the air flow rate through duct 26c and 26b is fixed, there is no longer a need for an air control valve corresponding to valve 28 of FIG. 1. However, as it is contemplated that turbine can also use liquid or gaseous hydrocarbon fuel, a valve 34 similar in design and operation to the air control valve discussed above has been disposed in proximity to upstream end 21c of first duct 20c in the embodiment of FIG. 3. A similar valve 35 is incorporated in the embodiment of FIG. 4. Considering FIG. 3 as exemplary in the situation where the fuel injected into basket 18c is lean enough, it would not be desirable to have air flowing through ducts 20c and 26c so as to provide further leaning out of the fuel. Consequently, valve 34 can be employed to close duct 20c and thereby prevent air from passing through duct 26c and mixing with the fuel injected into basket 18c.

Figure 5:
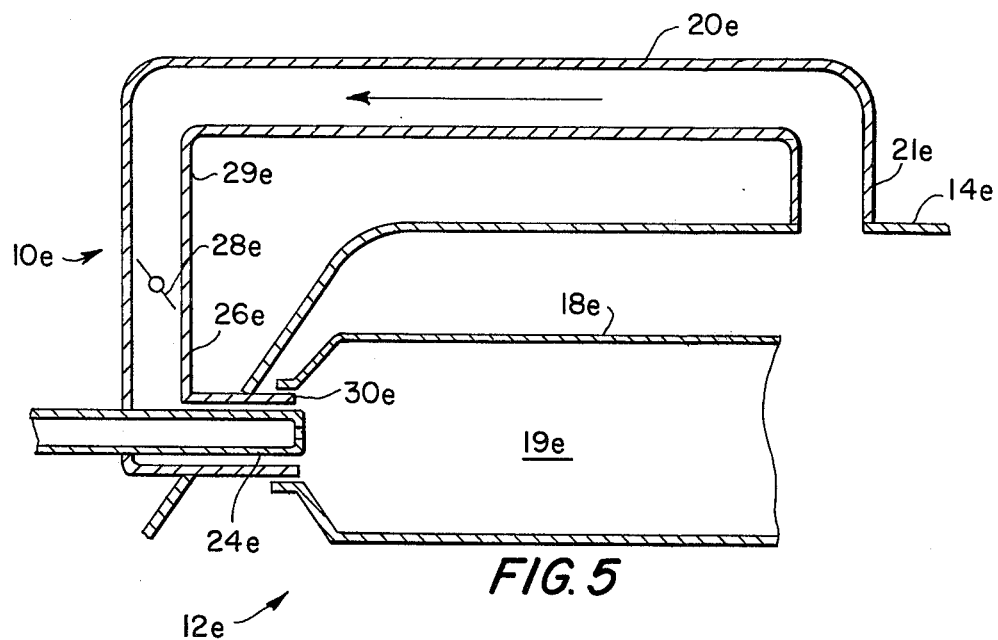
FIG. 5 is a cross-sectional view of an additional embodiment of the air proportioner in accordance with the invention.

A further embodiment of the invention is depicted in FIG. 5. This embodiment is also similar to those discussed above and like elements have been given the same numbers with an "e" attached. This embodiment is used only with turbines that are fueled with liquid or gaseous hydrocarbons and not coal or oil gas fuels and is identical to the embodiment depicted in FIG. 1 except that, with the elimination of the gasifier, all of the air flowing in first duct 20e feeds directly into second duct 26e, that is, air is simply ducted from shell 14e to the injector 24e. Valve 28e can be used to provide the richness of the mixture of air from duct 26e and liquid hydrocarbon fuel from injector 24e. As noted, a lean fuel to air mixture minimizes the emission of combustion products. However, with a lean fuel to air mixture, turbine performance deteriorates in the three areas of ignition, altitude, and acceleration performance. Thus, by adjusting valve 28e and thereby varying the air to fuel ratio performance, characteristics can be optimized for the conditions encountered. If gaseous hydrocarbon fuels are to be consumed in turbine 12e, valve 28e can be completely closed so as to prevent air passage through duct 26e. Generally, such fuel does not require additional leaning out.

Although the present invention has been described relative to an exemplary embodiment thereof, it will be understood by those skilled in the art that variations and modifications can be effected in these embodiments without departing from the scope and spirit of the invention.

I claim:

1. A gas turbine capable of burning either liquid hydrocarbon, oil gas or coal gas fuel, said turbine including a housing shell, a perforated combustion basket within the shell which defines a primary combustion zone, an air duct connected to the shell at such location as to allow said air duct to vent to a gasifier air heated by contact with said combustion basket in said shell, fuel injecting means for injecting gasified fuel into said turbine shell, and an air proportioner comprising means for venting air from said air duct for mixing with fuel from said gasifier so as to control the air-fuel mixture in the turbine.

2. A gas turbine in accordance with claim 1 wherein said venting means includes a further duct connected to said air duct and including a downstream end portion coaxial with and surrounding said injecting means.

3. A gas turbine in accordance with claim 2 further including an air control valve positioned in said further duct.

4. Apparatus in accordance with claim 1 wherein said venting means includes a further duct including a downstream end in fluid communication with a premixing chamber for mixing air from said further duct with gas to be injected by said injecting means, said premixing chamber being located at the upstream end of said fuel injecting means and in fluid communication therewith.

5. Apparatus in accordance with claim 4 further including an air control valve positioned in said further duct.

6. Apparatus in accordance with claim 1 wherein said venting means includes a further duct connected to said air duct at a location removed from the area of attachment of said air duct to said shell and wherein the diameter of said further duct is smaller than the diameter of said first duct so as to provide metering of the air flow from said air duct into said further duct.

7. An apparatus in accordance with claim 6 further including an air control valve positioned in said air duct.

8. Apparatus in accordance with claim 1 wherein said venting means includes a further duct connected to said air duct at a location removed from the area of attachment of said air duct to said shell and wherein said further duct includes an orifice therein or metering the air flow from said air duct into said further duct.

9. Apparatus in accordance with claim 8 further including an air control valve positioned in said air duct.

* * * * *